Patented July 25, 1944

2,354,632

UNITED STATES PATENT OFFICE 2,354,632

AROMATIC ETHERS OF 1,3-BUTADIENE-OL-2

Arthur Wolfram, Frankfort-on-the-Main, and Hellmuth Jahn, Beuthen, Upper Silesia, Germany; vested in the Alien Property Custodian No Drawing. Application July 29, 1941, Serial No. 404,522. In Germany June 6, 1940

4 Claims. (Cl. 260—612)

The present invention relates to aromatic ethers of 1,3-butadiene-ol-2.

We have found that at low temperature there occurs in the presence of mercury salts an addition of monovinyl acetylene on aromatic hydroxy bodies. The aromatic ethers of 1,3-butadiene-ol-2 are formed according to the equation:

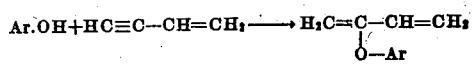

wherein Ar stands for an aromatic radical.

The constitution of the product can be established by the fact that upon addition of dilute sulfuric acid to the compounds obtained, they are split into vinyl methylketone and the aromatic hydroxy bodies. The vinylmethylketone could easily be detected by its reaction with phenylhydrazine so as to form methyl-3-phenyl-1-pyrazoline.

The reaction temperatures for the addition of acetylene on the aromatic hydroxy bodies are suitably at about 0° C. As aromatic hydroxy bodies, there may be named: the phenols, the homologues and substitution products thereof, such as for instance: ortho-cresol, meta-cresol and para-cresol; the xylenols; ortho-, meta- and para-chlorophenol; ortho-, meta- and para-bromophenol, the ethyl-phenols as well as phenols substituted in the nucleus by higher alkyl radicals such as butyl, isobutyl and amyl.

The reaction may also be carried out in diluents, for instance in ethers, dioxane, pyridine or the like. As catalyst, mercuric oxide has proved to be best; it may be used several times. The yields are good. By-products were not observed.

As the new compounds are very polymerizable, it is suitable to work in the presence of stabilizing agents, because otherwise part of the ethers polymerizes during the further treatment. Because of their polymerizing power the aromatic ethers of 1,3-butadiene-ol-2 may be used as intermediate products for the preparation of plastics.

The following examples serve to illustrate the invention, but they are not intended to limit it thereto, the parts being by weight:

(1) Monovinyl acetylene is introduced in excess at —5° C. to 0° C., while stirring, into a mixture of 940 parts of phenol, 250 parts of ethyl ether and 70 parts of mercuric oxide to which there are added 4 parts of thiodiphenyl amine as stabilizing agent. The reaction mass is rendered alkaline, while cooling with ice, and subjected to steam distillation. The ether layer is separated from the water, the whole is dried over sodium sulfate and the ethyl ether is removed. The residue is distilled under reduced pressure. After a slight first running the phenyl ether of 1,3-butadiene-ol-2 passes over at 65° C. to 66° C. under 3 mm. pressure in the form of a colorless oil. The ether is distinguished by an aromatic smell which is not disagreeable.

(2) A mixture of 880 parts of m-cresol, 100 parts of ethyl ether, 100 parts of mercuric oxide and 4 parts of thiodiphenylamine is cooled to 0° C. and saturated at this temperature with monovinyl acetylene, while vigorously stirring. The product is worked up as described in Example 1. The m-cresyl ether of the 1,3-butadiene-ol-2 passes over under a pressure of 2 mm. of mercury at 71° C. to 72° C. in the form of a colorless liquid, which likewise has a special smell. The yield amounts to about 1000 parts.

(3) Monovinyl acetylene is introduced at 0° C. into a mixture of 500 parts of meta-chlorophenol, 100 parts of ethyl ether, 100 parts of mercuric oxide and 4 parts of thiodiphenyl amine, while stirring until the solution is saturated. The reaction product is worked up according to Example 1; the meta-chlorophenyl ether of 1,3-butadiene-ol-2 is obtained which under 3 mm. pressure has a boiling point of 81° C. and becomes yellowish when exposed to the air. This ether has also an aromatic smell.

We claim:

1. The process of producing aromatic ethers of 1,3-butadiene-ol-2 which comprises reacting monovinyl acetylene upon a phenol at a temperature of about 0° C. in the presence of mercuric oxide as a catalyst.

2. The process of producing the phenol ether of 1,3-butadiene-ol-2 which comprises reacting monovinyl acetylene upon phenol at a temperature of from —5° C. to 0° C. in the presence of mercuric oxide as a catalyst.

3. The process of producing the m-cresyl ether of 1,3-butadiene-ol-2 which comprises reacting monovinyl acetylene upon m-cresol at a temperature of 0° C. in the presence of mercuric oxide as a catalyst.

4. The process of producing the m-chlorophenol ether of 1,3-butadiene-ol-2 which comprises reacting monovinyl acetylene upon m-chlorophenol at 0° C. in the presence of mercuric oxide as a catalyst.

ARTHUR WOLFRAM.
HELLMUTH JAHN.